May 25, 1954 R. R. SCHARMEN 2,679,201
DRAFT SHIELD
Filed July 21, 1950 2 Sheets-Sheet 1
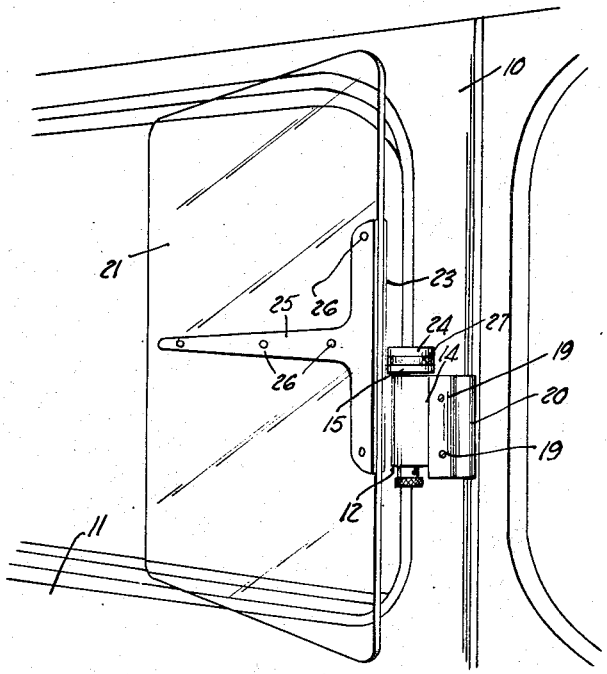
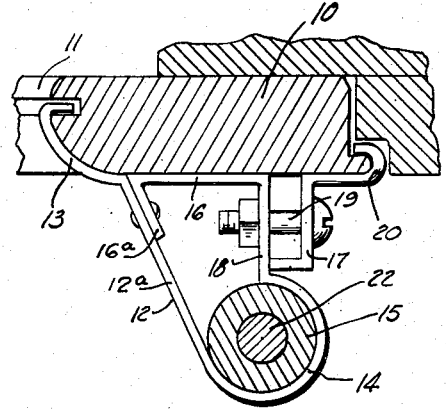
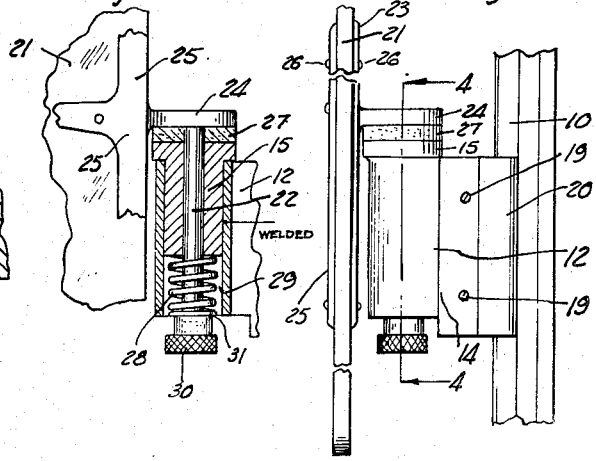
INVENTOR
RANDALL R. SCHARMEN
BY
HIS ATTORNEY May 25, 1954  R. R. SCHARMEN  2,679,201
DRAFT SHIELD
Filed July 21, 1950  2 Sheets-Sheet 2
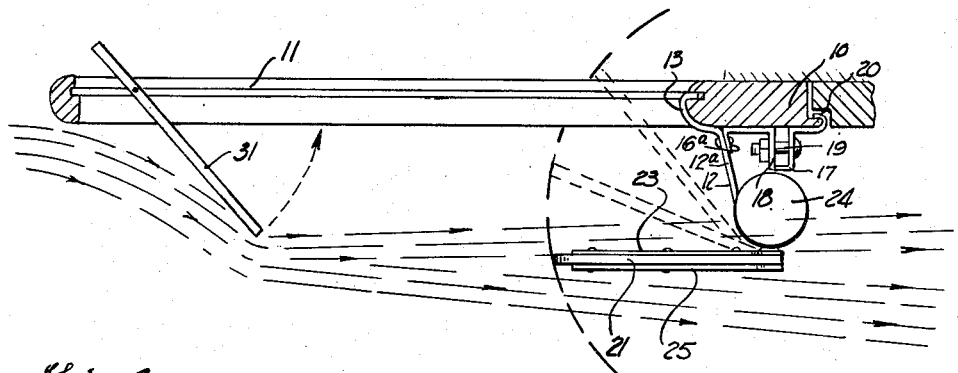
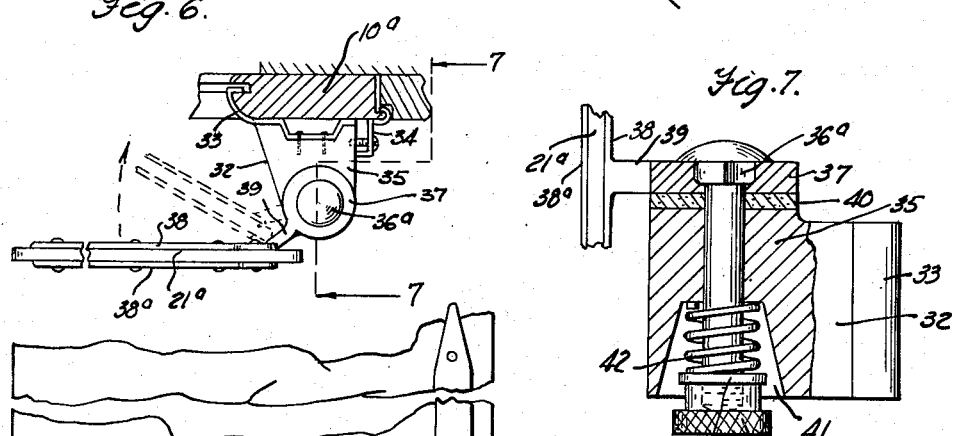
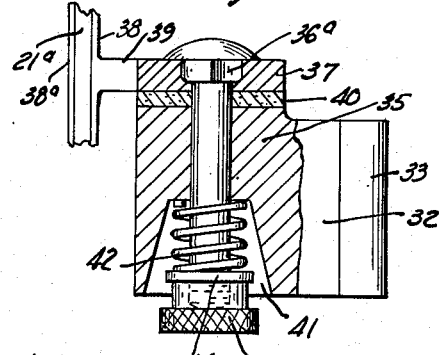
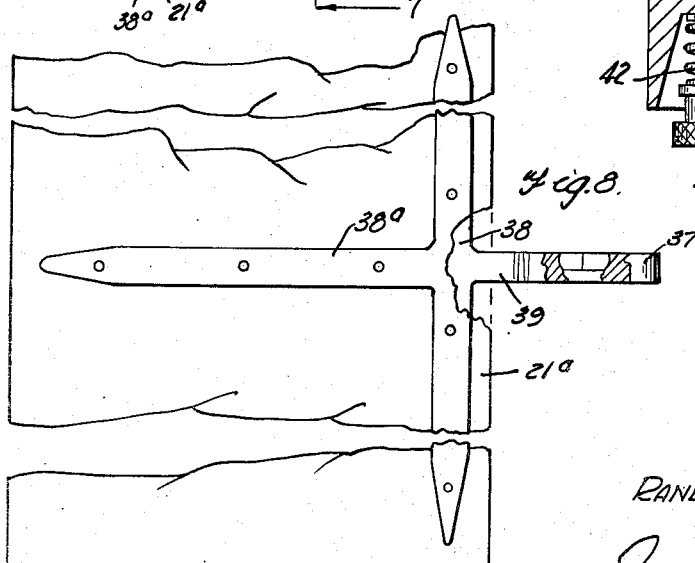
INVENTOR
RANDALL R. SCHARMEN
BY
HIS ATTORNEY Patented May 25, 1954

2,679,201

UNITED STATES PATENT OFFICE 2,679,201

DRAFT SHIELD

Randall R. Scharmen, San Antonio, Tex.

Application July 21, 1950, Serial No. 175,197

1 Claim. (Cl. 98—2)

This invention relates to draft shields, and has for one of its objects the production of a simple and efficient shield which may be easily and quickly attached to the door frame of an automobile, at the window portion thereof and selectively adjusted to direct air into the car and to cut-off the draft when desired.

A further object of this invention is the production of a simple and efficient attaching means for supporting a draft shield upon the door post of an automobile in a manner whereby the draft shield may be easily adjusted, installed, or removed.

Other objects of the present invention will appear throughout the following specification and claim.

In the drawings:

Figure 1 is a perspective view of the draft shield mounted in position upon a door post, portions of the adjoining parts of an automobile being shown;

Figure 2 is a top plan view of the shield attaching clamp, a portion of the door and frame of an automobile being shown in section and the journal barrel also being shown in section;

Figure 3 is a fragmentary edge elevational view of the shield and clamp, a portion of the door post being shown in edge elevation;

Figure 4 is a vertical sectional view taken on line 4—4 of Figure 3;

Figure 5 is a fragmentary horizontal sectional view taken through the window portion of an automobile door and support showing the draft shield in position relative to the conventional forward pivoted draft panel;

Figure 6 is a top plan view of a modified form of clamp, a portion of the door post and support being shown in section;

Figure 7 is an enlarged vertical sectional view taken on line 7—7 of Figure 6;

Figure 8 is a fragmentary side elevational view of the vane and hinge portion for engaging the supporting clamp.

By referring in detail to the drawings, it will be seen that 10 designates a conventional door post of an automobile door 11. A detachable clamp 12 is adapted to grip the door post 10 in the manner shown in Figures 1, 2 and 5. The clamp 12 comprises a curved or rolled jaw 13 which is adapted to grip the inner rounded vertical face of the post 10. The clamp 12 is provided with an outwardly protruding vertical bushing receiving portion 14 in which a vertical bushing 15 is welded. An outwardly inclined bracing portion 12ᵃ connects the bushing receiving portion 14 to the jaw 13. The clamp 12 also is provided with a post abutment strip 16 which is carried by the leg 18 of the clamp 12 and adapted to rest against the outer face of the post 10, as shown in Figure 2. The strip 16 is provided with an angle portion 16ᵃ which is secured to the inclined bracing portion 12ᵃ. The leg 18 is carried by the bushing receiving portion 14, as shown in Figure 2. A clamping plate 17 is adjustably secured to the leg 18 of the portion 14 by a securing means such as a bolt 19. A vertical rolled edge 20 is carried by the plate 17 to engage the outer edge of the post 10 and thereby securely anchor the clamp 12 upon the post 10, as shown in Figure 2.

A vane 21 of glass or other transparent material is supported by a pintle 22. The pintle 22 carries an integral vane supporting brace 23, which brace 23 engages the inner face of the vane and is integral with the head 24 of the pintle 22. A bracing plate 25 is clamped against the outer face of the vane 21 and the two braces are secured in clamping engagement with the vane 21 by means of suitable rivets 26. A friction washer 27 of composition, fiber, or rubber, is interposed between the head 24 and the upper end of the bushing 15. The bushing 15 terminates short of the lower end of the clamp 12, defining a socket 29 at the lower end thereof, as shown in Figure 4, and a coil spring 28 is fitted in the socket 29 upon the lower end of the pintle 22. The coil spring 28 abuts the lower end of the bushing 15 and a knurled nut 30 is threaded upon the lower end of the spring 28 and the nut 30. The tension of the spring 28 may be regulated to hold the head 24 of the pintle 22 in tight frictional engagement with the washer 27 and to thereby hold the vane in an adjusted angular position relative to the window opening of the door 11. The vane is of a heighth to readily swing into the window opening of the door 11 from the position shown in full lines in Figure 5 to the dotted line position thereof.

It should be noted that the clamp 12 may be readily adjusted and positioned upon or removed from and attached to the door post 10 by means of the adjustable or attachable plate 20 and bolt 19. The angular position of the vane relative to the window opening of the door 11 may also be regulated or adjusted by rotating the spindle 22 and tightening the nut 30. The vane 21 may be easily swung when the nut 30 is loosened and may then be locked at the desired angle by tightening the nut 30.

In carrying out the invention, the clamp 12 is secured to the door post 10 rearwardly of the conventional forward pivoted draft panel 31. The panel 31 is adjusted at a desired angle to regulate the flow of air and the vane 21 is then placed at a desired position to direct the air substantially parallel to the outside of the automobile, away from the automobile or into the automobile. Since the vane 21 is mounted on the rear post 10 of the door 11, currents of air will not strike the rear post 10 with great force, but the air will be guided through the space between the vane 21 and the outside of the automobile when the parts are in the position shown in Figure 5. By adjusting the panel 31 and vane 21, the air currents may be directed into any part of the car or automobile when desired, or all draft through the car or automobile may be shut-off entirely and directed outwardly. If desired, the panel 31 and vane 21 may be in any color to add to their appearance. The vane 21 may be easily adjusted, installed, or removed, and will not mar the finish of the automobile to which it is attached.

In Figures 6, 7, and 8, there is shown a modified form of the invention, wherein a clamp 32 engages the corner door post 10ª. The clamp 32 is provided with a curved or rolled jaw 33 which snugly fits around the outer rounded vertical face of the post 10ª, in a manner similar to that form shown in Figure 2. A clamping plate 34 similar to the clamp 17 secures the clamp 32 to the opposite side edge of the post 10ª. In this form, shown in Figures 6 and 7, a metal casting 35 is secured to the clamp 32, the clamp 32 being inset for a portion of its length into the abutting face of the casting 35 to facilitate the anchoring of the parts together.

The casting 35 supports a pintle or journal pin 36, and this pintle is provided with a square neck head 36ª for anchored connection with the connecting head 37 of the vane brace 38 to which brace the transparent vane 21ª is secured, as shown in Figure 8. The head 37 is connected to the brace 38 which engages one face of the vane 21ª and the head 37 is connected to the brace 38 by means of an angularly extending or inclined neck 39. A companion brace 38ª engages the opposite face of the vane 21ª. Suitable rivets anchor the braces and vane together in a manner defined with respect to the structure shown in Figures 1 and 3. A friction washer 40 is interposed between the upper end of the casting 35 and the lower face of the head 37.

The casting 35 is provided with a socket 41 at its lower end, as shown in Figure 7, and a coil spring 42 is seated in this socket 41 upon the lower end of the pintle 36. An adjusting knurled nut 43 is threaded upon the lower end of the pintle 36 to adjust the tension of the spring 42 and to facilitate the locking of the pintle 36 and vane 21ª carried thereby in a selected angular position relative to the window opening of its supporting door. A washer 44 is interposed between the spring 42 and the nut 43.

From the foregoing description it will be seen that a simple and efficient detachable hinge connection is provided for attaching a wind or air current deflecting vane to the outside face of a door post adjacent the window thereof, so that the vane may be frictionally locked in a selected angular position having a portion thereof protruding through the window or having the entire vane located outwardly of the window. In this structure, the air may be directed into and through the window or the air may be directed outwardly through the proper adjustment of the forward panel 31.

It should be understood that certain detail changes in the arrangement of parts and construction of the device may be employed without departing from the spirit of the invention, so long as such changes fall within the scope of the appended claim.

Having described the invention, what I claim as new is:

A draft shield support comprising a clamp adapted to grip the door post of a vehicle, said clamp comprising a curved jaw adapted to grip the inner rounded vertical face of a post, an outwardly inclined bracing portion supported by said curved jaw, an outwardly protruding vertical bushing receiving portion supported by said bracing portion, a vertical bushing fixed in said bushing receiving portion, a leg carried by said bushing receiving portion, a post abutment strip carried by said leg and having an angle portion secured to said inclined bracing portion, a clamping plate, a bolt adjustably securing said clamping plate to said leg, a vertical rolled edge carried by said clamping plate adapted to engage the outer edge of a post to securely anchor said clamp upon a post, a vane, a pintle journaled upon said vertical bushing, a head carried by said pintle and supporting said vane, a friction washer interposed between said head and one end of said bushing, a spring carried by said pintle and engaging the opposite end of said bushing, and a nut adjustably threaded upon said pintle and engaging said spring to regulate the tension of said spring to adjustably lock said head and bushing in engagement with said friction washer and to thereby secure the pintle in a fixed position within said bushing and to hold said vane in a selected adjusted position toward and away from the door post.

References Cited in the file of this patent

UNITED STATES PATENTS

| Number | Name | Date |
|---|---|---|
| 1,482,784 | Churchill | Feb. 5, 1924 |
| 1,988,016 | Nisbet | Jan. 15, 1935 |
| 2,080,431 | Morrison | May 18, 1937 |
| 2,534,348 | Gillig | Dec. 19, 1950 |

FOREIGN PATENTS

| Number | Country | Date |
|---|---|---|
| 588,960 | France | May 18, 1925 |